LEGEND
―○― ― ― data of table 3
△ ― ― ― data of Example
▲ ― ― ― Blank test
― ― ― ― Boundary line

United States Patent Office 3,361,521
Patented Jan. 2, 1968

3,361,521
METHOD FOR PURIFYING CONCENTRATED AQUEOUS ZINC CHLORIDE SYSTEM SOLUTION
Masatoshi Yoshida and Takashi Yamauchi, both of 8 Takabo-kawa-no-kami, Kitajima-machi, Itano-gun, Tokushima Prefecture, Japan; Osamu Yoshinari, 763 Tokari, Nagaizumi-machi, Suntou-gun, Shizuoka Prefecture, Japan; and Seiichi Yoshida, 111 Kitashimada-cho, 1-chome, Tokushima, Tokushima Prefecture, Japan
Filed May 3, 1967, Ser. No. 635,874
Claims priority, application Japan, Feb. 18, 1964, 39/8,531; Jan. 7, 1965, 40/411
6 Claims. (Cl. 23—97)

ABSTRACT OF THE DISCLOSURE

A method of purifying a concentrated aqueous zinc chloride solution to regenerate the same after it has been used for polymerizing acrylonitrile including the steps of oxidizing the recovered solution with hydrogen peroxide in the presence of a small amount of a basic compound whereby impurities in the form of non-volatile organic compounds are rendered inert.

Related applications

This application is a continuation-in-part of application Ser. No. 432,390, filed Feb. 12, 1965, now abandoned.

Background of the invention

The present invention relates to a method for purifying the concentrated aqueous salt solution comprising zinc chloride, and more particularly to the method as referred to above wherein such salt solution as solvent for acrylonitrile polymer or copolymer comprises zinc chloride only or mainly zinc chloride together with one or more of sodium chloride, calcium chloride, magnesium chloride, ammonium chloride and the like whereby active organic impurities in said solutions adversely affecting the polymerization are removed and/or inactivated.

Hitherto a concentrated aqueous solution comprising zinc chloride has been used as solvent for homogeneous solution polymerization or copolymerization of acrylonitrile. It has often been ackowledged that, when such salt solution is repeatedly used for that purpose, the active organic compounds to be accumulated therein effect undesirable influences on the polymerization reaction. In the manufacture of acrylic fibers, acrylic ester such as methyl acrylate, ethyl acrylate and the like, methacrylic ester such as methyl methacrylate, or vinyl acetate and the like are used as a monomer to be copolymerized in addition to acrylonitrile and further vinylsulfonic acid, allylsulfonic acid, methylallylsulfonic acid, vinylbenzenesulfonic acid or sodium salts thereof are also used for improving the dyeability. Some of them having a high boiling point or being involatile are to remain partly in the solvent after the polymerization has been completed. Above all when the spinning solution is directly and continuously prepared from the monomer with use of concentrated aqueous salt solution comprising zinc chloride as solvent, the non-volatile monomer or compounds of lower degrees of polymerization formed at the end of the reaction are inevitably accumulated in the solution. In manufacturing the delustered or dull like fibers, titanium oxide or the like also is added. On that occasion the surface active agent comprising higher aliphatic acid or the like is often used as a dispersant for the purpose of the dispersion of titanium oxide, wherein such surface active agent remains in the recovered solvent system after the purpose has been attained. The organic impurities as referred to above are called active organic compounds in this specification.

The spinning solution, which has been prepared through solution polymerization and retains such active organic compounds, is extruded in situ through nozzles or spinnerets into the coagulating bath comprising a diluted aqueous solution of inorganic salt or salts to form the tow wherein the most of said active organic compounds are to be transferred into the coagulating bath due to their lower molecular weight.

The coagulant being comparatively dilute salt solution is concentrated by evaporation so as to be used again as solvent for preparing acrylonitrile polymer or copolymer solution as spinning solution. However, the active organic compounds contained in the solvent causes undesirable influences, due to the fact that they consume radicals resulting from the polymerization initiator or polymer radicals, such as extremely lowering the yield of desired polymer, discoloring the polymer solution, making the fiber obtained therefrom brittle and lowering the whiteness of the fiber.

There has been proposed no satisfactory process for removing and/or inactivating the active organic compounds dissolved in the concentrated solution of salt comprising mainly zinc chloride. Even though any strong oxydant may be used, the desirable effect can not be obtained due to the particular conditions in the concentrated zinc chloride solution. United States Patent 2,746,840 has provided the process for removing metallic ions with use of persulfate. This prior art is not satisfiable because the zinc chloride solution treated by such method is to be discolored, and moreover when the treated solution is used, as solvent for polymerization, the yield of the polymer and the viscosity of the polymer solution are not stable and whiteness of the fiber obtained therefrom is lowered. Thus not only the purification effect is insufficient but also the persulfates cause a large amount of sulfuric acid radical in the treated solution which can not be removed without much labor and consequently increased expenses. Chloric acid or nitric acid system oxydants are also insufficient for removing and/or inactivating the organic compounds which produce the radical of chloric acid or nitric acid which adversely affects the polymerization.

In searching for a method to effectively remove and/or inactivate the active organic compounds without causing the faults as referred to above, it was discovered that the treatment of the salt solution with hydrogen peroxide in the presence of basic compounds is markedly effective.

According to the present invention the concentrated aqueous solution of zinc chloride or the salt mixture as referred to above is recovered or regenerated from such solution once used as solvent for polymerization by removing and/or inactivating the active organic impurities so as to impart no undesirable influences on the polymerization reaction by means of adding hydrogen peroxide in the presence of basic compound or compounds to the salt solution and keeping such solution at a temperature of at least 90° C. and more preferably 95–100° C.

Description of the preferred embodiment

Figure 1:
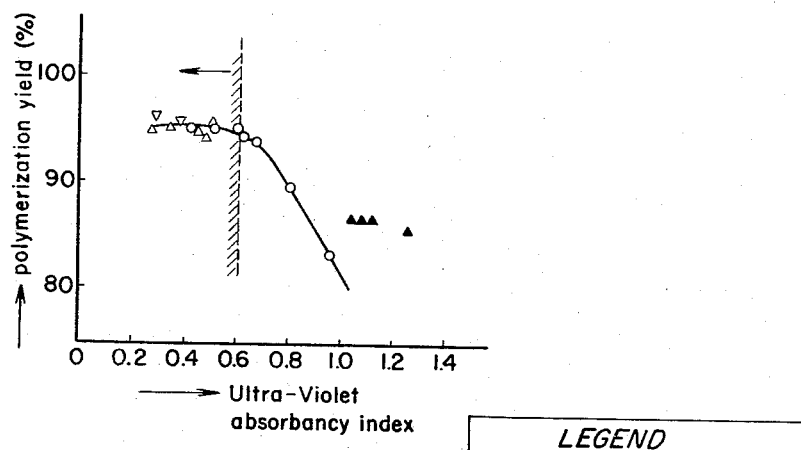
FIGS. 1 and 2 are graphs plotted from data in Table 3 in the specification illustrating the ratio between the yield percentage and the ultra-violet absorbancy index and the bromine value, respectively.

It has been well known that hydrogen peroxide is easily decomposed to release oxygen under the alkaline condition but the oxidizing power is quite weak in acidic state. However, pH value of the concentrated aqueous solution of zinc chloride is considerably low. For instance, it is approximately zero in the 60 weight percent solution and the pH value is about 1 in the 50 weight percent solution. Even if one tries to increase the pH value of the solution, it is quite difficult to make it above 3 and there may be produced the precipitation of zinc hydroxide which has undesirable effects on the polymerization and causes troubles in storing or transporting the solution. Thus, the use of hydrogen peroxide for removing and/or inactivating the active organic compounds contained in the concentrated zinc chloride system salt solution has hitherto been considered practically impossible. As stated above, the inventors have found that hydrogen peroxide is effectively used in the presence of the basic compound for removing and/or inactivating the active organic compounds retained in the concentrated zinc chloride solution. When the basic compound is added in the amount of at least 0.1% by weight, and more preferably 0.4–1.0% by weight, hydrogen peroxide is activated to effectively remove and/or inactivate the organic compounds despite the low pH value of the salt solution such as approximately 2.

Among such basic compounds there are zinc oxide, ammonium hydroxide, ammonium carbonate, sodium hydroxide, sodium carbonate, calcium oxide, calcium hydroxide, magnesium oxide and magnesium hydroxide. However, so far as zinc chloride solution is concerned, zinc oxide is the most preferable since it is a zinc compound, the same as the solvent salt. Mixture of two or more of such basic compounds may be added. It is desirable to select one or more of the basic compounds depending on constituents of the solvent salts in the solution to be treated. Even though 1.0 weight percent or more of the basic compound or the mixture thereof is added, the effect of purification is hardly improved. In some cases the excess amount of the basic compound can not be dissolved. The excess is not only useless but also may cause troubles in storing or transporting the solution and moreover may be an obstacle to polymerization.

In determining the basic compound concentration, the concentrated aqueous zinc chloride system solution is taken up by 10 gr. as pure zinc chloride constituent to be added in about 10 ml. of water and then several drops of the indicator, methyl orange solution (0.1%) is added to the resulting solution. By titration of 1 N hydrochloric acid, the basic compound concentration can be calculated from the following equation from the color changing point of the indicator:

$$C = \frac{0.041 \times D}{S} \times 100$$

wherein C represents the basic compound concentration (percent by weight), S means the material to be tested (gr.) and D is 1 N hydrochloric acid used (ml.).

It is a particularly necessary condition to prescribe the amount of the basic compound 0.4–1.0% by weight for removing and/or inactivating the active organic compounds lest the polymerization should be hindered. When this condition is not satisfied, the purpose can not be sufficiently attained. The presence of the basic compound makes hydrogen peroxide active even in the acidic state of the aqueous zinc chloride solution. The variation of the pH value of the aqueous zinc chloride solution to which zinc oxide has been added shall be given in Table 1.

TABLE 1

| Weight Percent Zinc Chloride | Basic Compound (weight percent) | | | |
|---|---|---|---|---|
| | 0.2 | 0.4 | 0.6 | 0.8 |
| 54 | 1.7 | 2.1 | 2.3 | 2.4 |
| 58 | 1.2 | 1.4 | 1.6 | 1.8 |
| 60 | 0.8 | 1.3 | 1.5 | 1.7 |

In order to make clear the effect of the process for removing and/or inactivating the active organic compounds in accordance with the present invention, the test results shall be given in Table 2 wherein the concentrated aqueous zinc chloride system solution was used as solvent for polymerization of the monomer comprising acrylonitrile in the amount of at least 85 weight percent, said solution having been purified by treating the salt solution which had already been used as solvent for the polymerization, taken up from the coagulating bath after spinning operation, condensed and treated with zinc oxide so as to control the basic compound contained in said solution to 0.6 weight percent, with hydrogen peroxide at a temperature of 95° C. for 60 minutes. The viscosity shall be shown by the time (second) during which 0.315 cm. (⅛ inch) diameter of steel ball descends by 20 cm. in the polymer solution at a temperature of 45° C. The transparency shall be determined on condition that the light is 420 mμ in wave length and the specimen is 20 mm. in thickness.

TABLE 2

| Hydrogen Peroxide (weight percent) | Polymerization Yield (percent) (Polymerization time: 6 hours) | Transparency (percent) (420 mμ, Cell. 20 mm.) | Viscosity (second) |
|---|---|---|---|
| 0 | 89.5 | 53 | 85 |
| 0.1 | 90.7 | 55 | 98 |
| 0.2 | 92.5 | 58 | 113 |
| 0.3 | 94.3 | 62 | 133 |
| 0.4 | 94.6 | 65 | 130 |
| 0.5 | 94.5 | 66 | 131 |
| 0.6 | 94.5 | 65 | 132 |

From the results referred to above it will be clear that the treatment with hydrogen peroxide contributes so much to raise polymerization yield and preventing the spinning solution from discoloring. It is preferable to use hydrogen peroxide more than 0.1 weight percent as pure constituent in relation to the solution to be treated and 0.3–1.0 weight percent when the active organic compounds exist in a larger quantity. The reaction is effectively carried out at a temperature of at least 90° C., and more perferably 95–100° C.

On the other hand, by varying the basic compound content in the reaction system when the oxidizing treatment is carried out with hydrogen peroxide the results were obtained as in Table 3, wherein the acid content is represented by weight percent of free hydrochloric acid in the concentrated aqueous zinc chloride system solution and the basic compound content is shown by weight percent of the basic compound in the concentrated aqueous zinc chloride system solution. The treatment was done by use of hydrogen peroxide in the amount of 0.4 weight percent as pure constituent with stirring at a temperature of 97° C. for 30 minutes. Test 1 in said table was carried out in respect of the concentrated aqueous zinc chloride system solution which has not been treated.

TABLE 3

| | Test No. | | | | | | | |
|---|---|---|---|---|---|---|---|---|
| | 1 | 2 | 3 | 4 | 5 | 6 | 7 | 8 |
| Acid Content (weight percent) | | 0.2 | 0.1 | | | | | |
| Basic Compound Content (weight percent) | | | | 0.1 | 0.2 | 0.4 | 0.6 | 0.8 |
| Br Value | 7.58 | 6.75 | 6.38 | 2.63 | 0.80 | 0.32 | 0.28 | 0.22 |
| Absorbancy Index of Treated Solution (Wave length 265 m$\mu$) (Cell 10 mm.) | 10.7 | 0.93 | 0.80 | 0.68 | 0.60 | 0.59 | 0.50 | 0.43 |
| Carbon Constituent in Treated Solution (weight percent) | 0.044 | 0.043 | 0.037 | 0.030 | 0.025 | 0.022 | 0.018 | 0.015 |
| Polymerization Yield (percent) | 70.3 | 83.2 | 89.3 | 93.6 | 94.0 | 94.9 | 94.8 | 95.0 |

Bromine value, ultra-violet absorbancy index and carbon constituent as shown in Table 3, is taken as a measure of the amount of organic impurities which act as obstacles in the polymerization process and in the fiber properties. The bromine value is detected as an amount of 0.05 NKBrO$_3$ to be titrated with respect to the 50 gr. of sample solution. An ultra-violet absorbancy index is measured at the wave length of 265 m$\mu$ by using a 10 mm. cell thickness.

Figure 2:
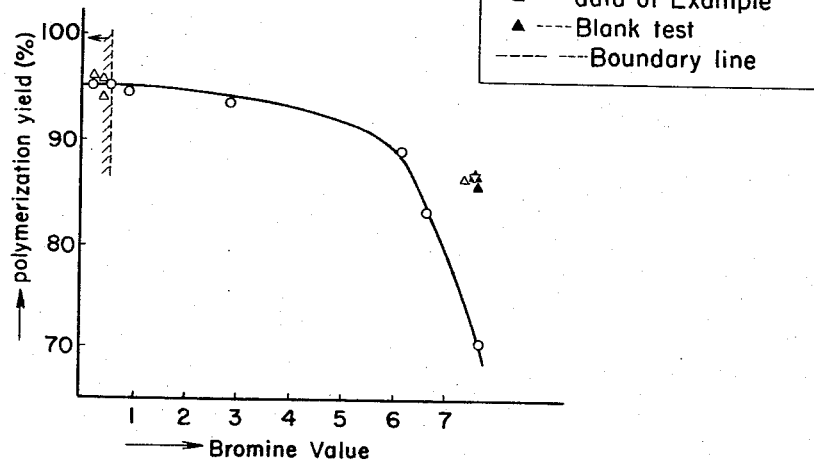

From the results referred to above, it has been found that the treatment with hydrogen peroxide is more effective under the condition wherein the basic compound content is more than 0.1 weight percent. Immediately after the treatment the solution is filtered. Thus, when the salt solution recovered after polymerization and spinning is treated with hydrogen peroxide under the specified condition as referred to above, high values of the ultra-violet absorbancy index and the bromine value can be brought to values less than 0.60 and 0.50, respectively, so that cycles of desirable polymerization and spinning may proceed with excellent reproducibility. The values of the ultra-violet absorbancy index and the bromine value recited in Table 3 are plotted on FIGS. 1 and 2, respectively, to illustrate their use as a means for checking the end point of the aqueous salt solution. From both graphs, it is apparent that the polymerization yield decreases in inverse proportion to the value of the ultra-violet absorbancy index and the bromine value which is proportional to the amount of impurities accumulated in the aqueous salt solution.

With the above, the purpose of the present invention has almost been attained, but when unreacted hydrogen peroxide and unsufficiently reacted active organic compounds remain, it is preferable to subject the solution to any suitable reduction in order to perfectly remove and/or inactivate them lest the polymerization should be hindered. As the reducing agent many substances may be taken into consideration among which zinc powder is the most effective. The zinc treatment is carried out by adding 0.1–0.3 weight percent of zinc powder to the system under the similar condition as of hydrogen peroxide treatment. In order to make the purification more perfect, the active charcoal may be added in the amount of 0.1–0.2 weight percent to the solution after the zinc treatment has been completed, wherein the reaction condition is quite same with that of hydrogen peroxide treatment.

Polymerization or copolymerization of acrylonitrile in the concentrated aqueous solution of inorganic salt or salts which has been purified according to the treatments as referred to above, can be carried out in accordance with any conventional process. However, it can be proceeded favorably by using as polymerization initiator, the organic compound such as a,a'-azo-bis-iso-butylonitrile and the like or the oxidizing compounds such as hydrogen peroxide, ammonium persulfate, potassium persulfate and sodium persulfate or Redox catalyst comprising the oxydant as referred to above and the reducing agent such as sodium methabisulfite or potassium methabisulfite.

When the solution treated in accordance with the present invention is used as solvent, the polymerization yield can be raised to the sufficient value after the lapse of certain time, which will prove this process is also economically favorable since the solvent salt such as zinc chloride is hardly lost.

It should be noted that the process according to the present invention can remove metallic ions such as a ferric or ferrous ion in the concentrated aqueous solution of inorganic salts as well as the active organic compounds.

The process according to the present invention shall be explained in more detail hereinafter by way of example only.

*Example*

The solution of monomers comprising 89.0 weight parts acrylonitrile, 9.5 weight parts methyl acrylate and 1.5 weight parts sodium allyl sulfonate in 1000 weight parts concentrated aqueous solution of inorganic salts as shown in column A in Table 4 was sufficiently stirred and polymerized with use of hydrogen peroxide as polymerization initiator. The resulting spinning solution was extruded through spinnerets into the coagulating bath comprising 15 weight percent of such salts as the solvent to form tow. The inorganic salts in the spinning solution was transferred little by little into the coagulating bath together with the unreacted monomers and water-soluble organic impurities formed at the end of the polymerization reaction. The concentration of the inorganic salts in the coagulant finally attained approximately 18 weight percent. Under the reduced pressure, water and the unreacted volatile monomers were removed from the solution so that the concentration of the inorganic salts therein came to 58 weight percent. The concentrated aqueous solution thus treated which is designated as the solution (i) was used as solvent for the polymerization. To 500 weight parts of the solution (i) were added 44.5 weight parts acrylonitrile, 4.75 weight parts methyl acrylate and 0.75 weight parts sodium allyl sulfonate. The resulting solution was sufficiently stirred, added with 0.064 weight parts hydrogen peroxide as polymerization initiator and left stand for 6 hours in the reaction vessel which was kept at a temperature of 45° C. The polymerization yield, transparency and viscosity of the resulting polymer solution are shown in column B of Table 4 which were determined similarly as in the Table 2. As seen from the results, it is impossible to carry out spinning operation smoothly and obtain excellent fiber of high whiteness.

On the other hand, to 1000 weight parts of the solution (i) were added the compounds as shown in column C of said table. The resulting solution was heated and treated so that the basic compound content therein might be controlled to the values as shown in column D. Then, the solution was treated by addition of hydrogen peroxide under the conditions as shown in column E with stirring and filtered after the reaction completed so that the organic impurities might be removed and/or inactivated lest the polymerization should be adversely affected. In some cases, the after treatment with zinc powder and active charcoal was carried out as shown in columns F and G. The concentrated aqueous solution of the inorganic salts treated in accordance with the process as referred to above, which is designated as the solution (ii), was clear and transparent and hardly had the organic impurities. The results are given in column H, which show the effects in removing and/or inactivating the organic impurities of the present invention. Results of the polymerization with use of the solution (ii) as solvent in the way similar to the case of the solution (i) are given in column I which prove that the salt solution recovered or regenerated by the present invention is satisfactory as solvent for the polymerization.

TABLE 4

| (A) Salts of Solvent: | | | | | | | |
|---|---|---|---|---|---|---|---|
| Zinc Chloride (wt. percent) | 58 | | | 54 | | | |
| Sodium Chloride (wt. percent) | 0 | | | 0 | | | |
| Ammonium Chloride (wt. percent) | 0 | | | 4 | | | |
| Pure Water (wt. percent) | 42 | | | 42 | | | |
| (B) Polymerization with Untreated Solvent: | | | | | | | |
| Polymerization Yield (percent) | 89.3 | | | 90.7 | | | |
| Transparency of Polymer Solution (percent) | 58 | | | 55 | | | |
| Viscosity of Polymer Solution (sec.) | 85 | | | 89 | | | |
| (C) Basic Compounds Added: | | | | | | | |
| Zinc Oxide (wt. parts) | 8 | 8 | 0 | 7 | 0 | 0 | 0 |
| Ammonium Hydroxide (wt. parts) | 0 | 0 | 0 | 0 | 7 | 0 | 0 |
| Ammonium Carbonate (wt. parts) | 0 | 0 | 0 | 0 | 0 | 9 | 0 |
| Sodium Hydroxide (wt. parts) | 0 | 0 | 0 | 0 | 0 | 0 | 0 |
| Sodium Carbonate (wt. parts) | 0 | 0 | 0 | 0 | 0 | 0 | 0 |
| (D) Basic Compounds Content (wt. percent) | 0.70 | 0.70 | 0 | 0.61 | 0.62 | 0.59 | 0 |
| (E) Hydrogen Peroxide: | | | | | | | |
| Added (wt. percent) | 0.3 | 0 | 0 | 0.5 | 0.3 | 0.3 | 0 |
| Treatment Temp. (° C.) | 95 | | | 95 | 100 | 95 | |
| Treatment Time (min.) | 30 | | | 30 | 30 | 30 | |
| (F) Zinc Powder: | | | | | | | |
| Added (wt. percent) | 0 | 0.2 | 0 | 0 | 0.2 | 0 | 0 |
| Treatment Temp. (° C.) | | 100 | | | 100 | | |
| Treatment Time (min.) | | 30 | | | 30 | | |
| (G) Active Charcoal: | | | | | | | |
| Wt. percent | 0 | 0 | 0 | 0 | 0 | 0.1 | 0 |
| Treatment Temp. (° C.) | | | | | | 100 | |
| Treatment Time (min.) | | | | | | 30 | |
| (H) Treated Solution: | | | | | | | |
| Br Value | 0.32 | 0.33 | 7.58 | 0.31 | 0.33 | 0.27 | 7.43 |
| Transparency (percent) | 98 | 99 | 87 | 99 | 99 | 98 | 89 |
| Carbon Content (wt. percent) | 0.018 | 0.018 | 0.031 | 0.018 | 0.015 | 0.019 | 0.029 |
| Absorbancy Index | 0.50 | 0.50 | 1.03 | .48 | 0.51 | 0.38 | 1.17 |
| (I) Polymerization with Treated Solution: | | | | | | | |
| Polymerization Yield (percent) | 94.6 | 94.7 | 87.3 | 94.8 | 94.7 | 95.0 | 87.2 |
| Transparency (percent) | 68 | 70 | 43 | 66 | 68 | 67 | 42 |
| Viscosity (sec.) | 130 | 131 | 100 | 131 | 133 | 129 | 100 |

| (A) Salts of Solvent: | | | | | | | | | | |
|---|---|---|---|---|---|---|---|---|---|---|
| Zinc Chloride (wt. percent) | 54 | | | | 50 | | | | | |
| Sodium Chloride (wt. percent) | 4 | | | | 4 | | | | | |
| Ammonium Chloride (wt. percent) | 0 | | | | 4 | | | | | |
| Pure Water (wt. percent) | 42 | | | | 42 | | | | | |
| (B) Polymerization with Untreated Solvent: | | | | | | | | | | |
| Polymerization Yield (percent) | 87.6 | | | | 88.4 | | | | | |
| Transparency of Polymer Solution (percent) | 57 | | | | 53 | | | | | |
| Viscosity of Polymer Solution (sec.) | 83 | | | | 87 | | | | | |
| (C) Basic Compounds Added: | | | | | | | | | | |
| Zinc Oxide (wt. parts) | 8 | 0 | 0 | 0 | 8 | 0 | 0 | 0 | 0 | 0 |
| Ammonium Hydroxide (wt. parts) | 0 | 0 | 0 | 0 | 0 | 7 | 0 | 0 | 0 | 0 |
| Ammonium Carbonate (wt. parts) | 0 | 0 | 0 | 0 | 0 | 0 | 9 | 0 | 0 | 0 |
| Sodium Hydroxide (wt. parts) | 0 | 7 | 0 | 0 | 0 | 0 | 0 | 7 | 0 | 0 |
| Sodium Carbonate (wt. parts) | 0 | 0 | 11 | 0 | 0 | 0 | 0 | 0 | 11 | 0 |
| (D) Basic Compounds Content (wt. percent) | 0.68 | 0.54 | 0.63 | 0 | 0.71 | 0.60 | 0.59 | 0.54 | 0.63 | 0 |
| (E) Hydrogen Peroxide: | | | | | | | | | | |
| Added (wt. percent) | 0.3 | 0.5 | 0.3 | 0 | 0.3 | 0.5 | 0.5 | 0.5 | 0.6 | 0 |
| Treatment Temp. (° C.) | 100 | 95 | 97 | | 100 | 100 | 97 | 100 | 95 | |
| Treatment Time (min.) | 30 | 30 | 30 | | 30 | 30 | 30 | 30 | 30 | |
| (F) Zinc Powder: | | | | | | | | | | |
| Added (wt. percent) | 0 | 0.2 | 0 | 0 | 0.2 | 0.2 | 0 | 0.2 | 0 | 0 |
| Treatment Temp. (° C.) | | 100 | | | | 100 | | 100 | | |
| Treatment Time (min.) | | 30 | | | | 30 | | 30 | | |
| (G) Active Charcoal: | | | | | | | | | | |
| Wt. percent | 0 | 0 | 0.1 | 0 | 0 | 0.2 | 0 | 0 | 0.1 | 0 |
| Treatment Temp. (° C.) | | | 100 | | | 100 | | | 100 | |
| Treatment Time (min.) | | | 30 | | | 30 | | | 30 | |
| (H) Treated Solution: | | | | | | | | | | |
| Br Value | 0.29 | 0.33 | 0.31 | 7.29 | 0.29 | 0.30 | 0.31 | 0.29 | 0.27 | 7.64 |
| Transparency (percent) | 99 | 97 | 99 | 88 | 98 | 97 | 99 | 99 | 98 | 86 |
| Carbon Content (wt. percent) | 0.016 | 0.017 | 0.015 | 0.033 | 0.015 | 0.014 | 0.016 | 0.017 | 0.016 | 0.031 |
| Absorbancy Index | 0.34 | 0.37 | 0.40 | 1.26 | 0.39 | 0.42 | 0.47 | 0.32 | 0.39 | 1.10 |
| (I) Polymerization with Treated Solution: | | | | | | | | | | |
| Polymerization Yield (percent) | 95.0 | 94.8 | 94.7 | 86.0 | 94.7 | 94.3 | 94.6 | 95.0 | 95.8 | 87.3 |
| Transparency (percent) | 65 | 65 | 68 | 42 | 68 | 66 | 69 | 67 | 64 | 44 |
| Viscosity (sec.) | 132 | 133 | 137 | 99 | 132 | 134 | 135 | 130 | 129 | 102 |

Inasmuch as the preferred embodiment of the present invention is subject to many modifications and applications, it is intended that all matter contained in the foregoing description or shown on the accompanying drawing be interpreted as illustrative and not in a limiting sense.

What is claimed is:

1. A method of purifying a concentrated aqueous zinc chloride solution which has been used for polymerizing acrylonitrile and which contains impurities in the form of non-volative organic compounds that act as obstacles in a subsequent polymerization, comprising the steps of:
 recovering the solution after polymerization,
 oxidizing the recovered solution with hydrogen peroxide in the presence of more than 0.1% by weight of a basic compound at temperatures above 90° C. so that the non-volatile organic compounds are rendered inactive and whereby the resulting solution is brought to an ultra-violet absorbancy index of less than 0.60 and a bromine value of less than 0.50.

2. The invention as recited in claim 1 wherein the basic compound is selected from a group consisting of zinc oxide, calcium oxide, calcium hydroxide, magnesium oxide and magnesium hydroxide.

3. The invention as recited in claim 1 wherein the basic compound is selected from a group consisting of ammonium hydroxide, ammonium carbonate, sodium hydroxide and sodium carbonate.

4. The invention as recited in claim 1 wherein zinc oxide in the amount of at least 0.4% by weight is utilized as the basic compound during the oxidizing step.

5. The invention as recited in claim 1 wherein the hydrogen peroxide is in the amount of 0.3 to 1.0% by weight.

6. The invention as recited in claim 1 wherein the aqueous zinc chloride solution to be treated is taken from a coagulating bath and concentrated by evaporating water and other volatiles to any suitable salt concentration as solvent for preparing the spinning solution of acrylonitrile polymer or copolymer.

References Cited

UNITED STATES PATENTS

| | | | |
|---|---|---|---|
| 1,839,220 | 1/1932 | Henglein et al. | 23—97 |
| 2,017,930 | 10/1935 | Westbrook | 23—97 X |
| 2,402,371 | 6/1946 | Christensen | 23—97 X |
| 2,746,840 | 5/1956 | Davis | 23—97 |
| 3,148,944 | 9/1964 | Van Dijk et al. | 23—97 |

MILTON WEISSMAN, *Primary Examiner.*

EDWARD STERN, *Examiner.*